United States Patent [19]

Pipkin

[11] 4,003,015
[45] Jan. 11, 1977

[54] MULTIPATH SONAR SYSTEM

[75] Inventor: Edward L. Pipkin, Panama City, Fla.

[73] Assignee: The United States of America as represented by the Secretary of the Navy, Washington, D.C.

[22] Filed: July 3, 1975

[21] Appl. No.: 593,919

[52] U.S. Cl. ............................ 340/3 R; 340/3 C; 340/6 R

[51] Int. Cl.² ..................... G01S 9/66; G01S 7/62

[58] Field of Search .................. 340/3 C, 3 R, 6 R

[56] References Cited

UNITED STATES PATENTS

| 2,972,731 | 2/1961 | Beebe | 340/3 R |
| 3,178,678 | 4/1965 | Grieg | 340/3 R |
| 3,914,730 | 10/1975 | Jones | 340/3 R |

*Primary Examiner*—Richard A. Farley
*Attorney, Agent, or Firm*—Richard S. Sciascia; Don D. Doty; Harvey A. David

[57] ABSTRACT

A sonar system is disclosed which incorporates a first receiver for receiving an acoustical signal from a target via a vertical path sector of water encompassing said target, a second receiver for receiving an acoustical signal from said target via a horizontal path sector of water also encompassing said target, and readouts for displaying the images of said target along with the physical characteristics of said vertical and horizontal water path sectors encompassing it. Selector switches are employed that enable an operator to select any one of a number of said vertical and horizontal water path sectors and to highlight them if desired, so as to optimize the target image as a result of selecting the water path sectors having the least signal resistance. Optionally, the subject sonar may be made active by including a target search signal broadcasting means, so the aforementioned received acoustical signals will be target echo rather than target source signals.

18 Claims, 7 Drawing Figures

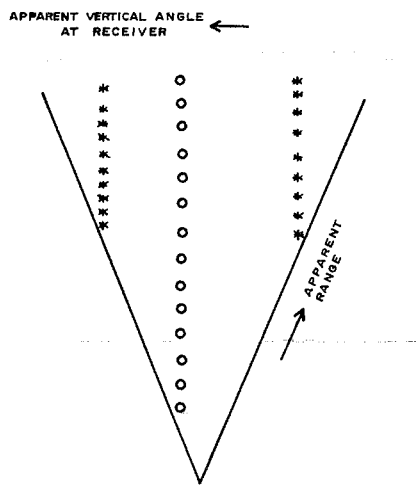
Fig. 3
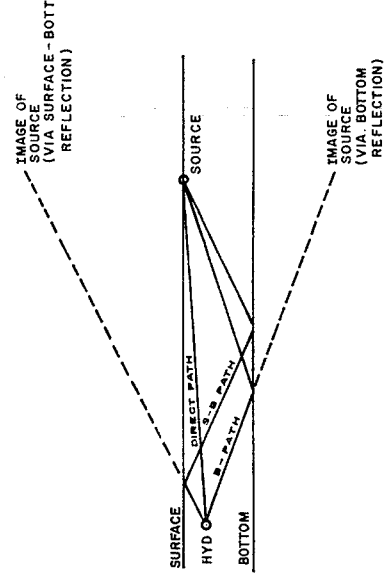
Fig. 2
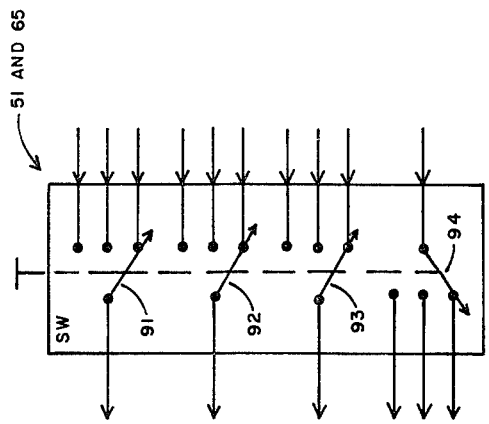
Fig. 5
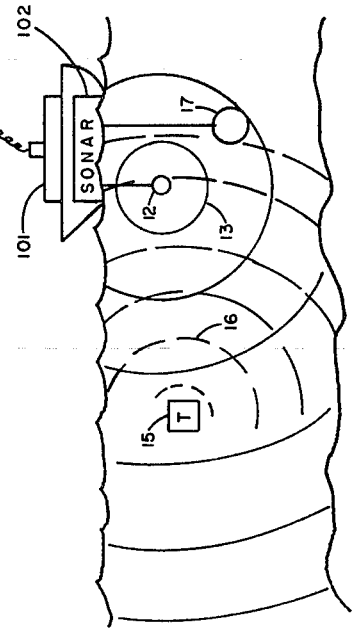
Fig. 4
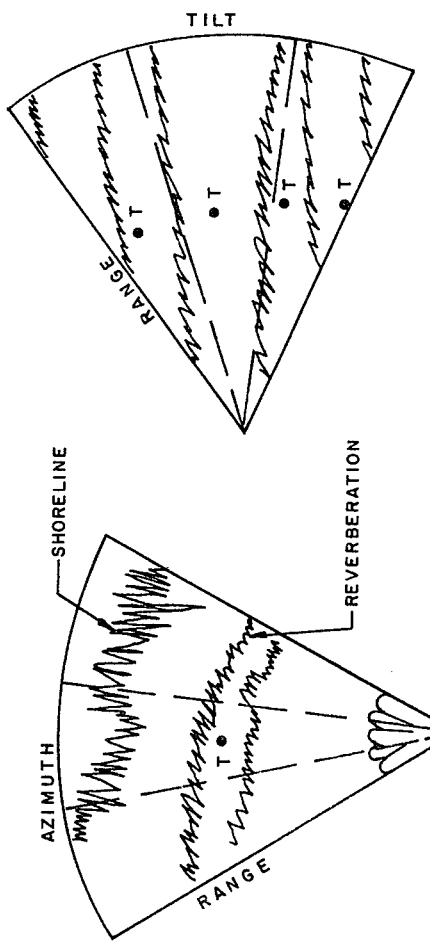
Fig. 7
Fig. 6

MULTIPATH SONAR SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates to echo-search-ranging systems and, in particular, is an echo-search-ranging sonar system. In even greater particularity, the invention comprises a multiprocessing sonar system which enables one or more operators to evaluate the targets acquired thereby and the environment in proximity therewith simultaneously, thereby effectively enhancing the utility thereof.

DESCRIPTION OF THE PRIOR ART

The sonar art is such crowded art that it would be impossible and impractical to attempt to describe it all at this time. Moreover, the high resolution types of sonar systems are copious in quantity, too; therefore, inasmuch one skilled in such art would probably be cognizant of such sonar systems, it is herewith mentioned that the nearest known to the subject invention consists of the types that employ narrow horizontal beams in the receiving hydrophone which are formed either by delay lines or lenses and thus require high bearing information resolution. Of course, the resolution of target range information is ordinarily optimized in such prior art sonars as a result of limiting the pulse width of their search signals to fractions of a millisecond.

Although fairly satisfactory for many practical purposes, such prior art sonar systems are limited in several respects in the coastal and riverine environments. Because they, relatively speaking, are shallow water situations, very intense vertical sound velocity gradients are encountered. Also, in salt water situations, such intense vertical sound velocity gradients are enhanced further due to the added effects of increased salinity gradients. Such situation, of course, adversely affect the operations of all known prior art sonar systems, at least to the extent that target acquisition information quite often leaves something to be desired.

One attempt to deal with shallow water coastal and riverine environmental conditions is represented by sonars having variable depth capability; however, all other known sonars seem to be at the mercy of such deleterious conditions, and when they constitute the working medium, said sonars simply cannot operate effectively. Therefore, it may readily be seen that improvements in the sonar art--even small ones--are being sought with a considerable degree of dilligence by those needing underwater target information.

SUMMARY OF THE INVENTION

The subject invention is a multipath processing sonar incorporating means for broadcasting a predetermined acoustical signal throughout a given volume of water and means for receiving echos thereof from both the horizontal and vertical directions--that is, from directions that are essentially normal to each other--thereby enabling one or more operators to observe both the hunted targets acquired thereby and the reverberations received thereby which were caused by the particular physical and chemical characteristics which existed within the environmental medium ambient to or in operation proximity with said hunted targets. Of course, it has been found that such dual signal processing of target echo signals enable a sonar operator to make a better decision with respect to the type of target acquired, its relative bearing, and its range, since its environmental medium can, to some extent, be taken into consideration. Consequently, the subject invention constitutes an advance in the art for its intended purpose, with said advance effecting improved operation and results.

It, therefore, is an object of this invention to provide an inproved sonar system.

Another object of the invention is to provide an improved echo-search-ranging system.

Still another object of this invention is to provide a sonar system which acquires, processes, and reads out both target echo information and the environmental medium reverberation information ambient thereto, so as to facilitate the interpretation of any desired information pertinent thereto by the operator thereof.

A further object of this invention is to provide a method and means for determining and displaying the vertical distribution of target and reverberation echoes received from within any predetermined appropriate environmental medium, but especially from within an aqueous medium.

A further object of this invention is to provide an improved method and means for acquiring and interpreting sonar information from within shallow water coastal and riverine environments.

Another object of this invention is to provide an improved method and means or measuring and assessing the environmental conditions ambient to an acquired target in real time.

Still another object of this invention is to provide an operator a method and means for optimumly adjusting the tilt of his target search signal, so as to exclude much of the boundary reverberation in the operative environmental medium and to enable him to select that ray path therethrough which is most efficiently transporting the search and echo signal energies to and from an acquired target.

Another object of this invention is to provide a method and means which may be used to infer water depth at a distance.

Another object of this invention is to provide an improved method and means for displaying the water depth of a given acquired target.

Another object of this invention is to provide a sonar system having an improved signal-to-reverberation ratio.

Another object of this invention is to provide a sonar having improved range resolution and less signal degradation, due to decreased multipathing.

A further object of this invention is to provide a method and means, which when combined with the shaping of transmitter directivity patterns, may be effective for acoustic penetration of shadow zones within a subaqueous environmental medium.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 2 discloses a gang switch that can be used as switches 51 and 65 of FIG. 1.

FIG. 3 depicts a theoretical representation of acoustical paths taken by sonic energy as it travels from an effective source to a hydrophone;

FIG. 4 is a graphical representation of range vs. tilt, when the images of sonic energy are displaced along the surface of FIG. 3 and then plotted;

FIG. 5 discloses a horizontal PPI display of typical targets and environmental medium reverberations in proximity therewith;

FIG. 6 discloses a vertical PPI display of typical targets and environmental medium reverberations in proximity therewith;

FIG. 7 is a quasi-pictorial view of an underwater situation where the subject invention may be used to an advantage.

BRIEF DESCRIPTION OF THE PREFERRED EMBODIMENT

Figure 1:
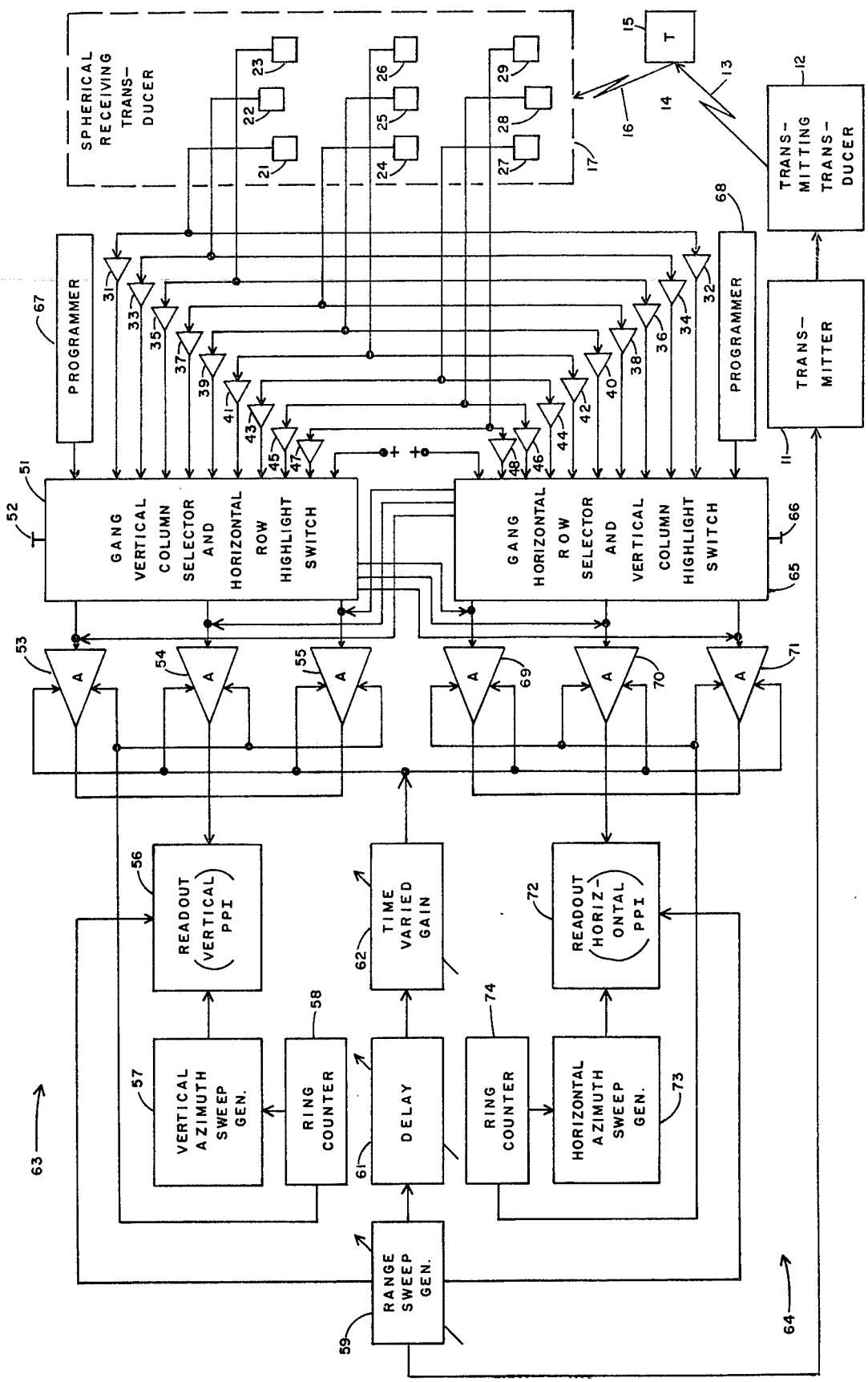
FIG. 1 is a block diagram of the sonar system constituting the sonar system constituting the subject invention.

At the outset, it should be understood that, although the preferred embodiment of the invention to be discussed now is a sonar system which is intended to search for underwater targets, the overall invention per se should not be considered as being limited thereto. Thus, it may, in fact, be any echo-search-ranging system that is properly designed for the environmental medium within which it is intended to work. For example, it may be a radar, infrared system, a sonci system for use within other than water, or the like. Obviously, it would be well within the purview of the artisan to make whatever design choices as would be necessary to make the invention operative in any desired environmental medium, in order to search for any desired type of target, as long as he had the benefit of the teachings presented herewith.

Referring now to FIG. 1, there is shown a transmitter 11, with the output thereof connected to the input of an electro-acoustical transmitting transducer 12 which timely broadcasts an acoustical search signal 13 through water 14 toward a target 15 located within said water 14. An acoustical echo 16 from target 15 is then subsequently received electroacoustical transducer 17.

Although receiving transducer 17 may be of any type warranted by the operational circumstances, in this case, it is preferably a spherically configured transducer having a predetermined pluarlity of electro-acoustical energy converter units disposed in combination with a temperature compensated spherical lens, thereby making it directional or omni-directional, as desired.

As dislosed in FIG. 1, receiving transducer 17 incorporates nine piezoelectric elements 21 through 29; however, it should be understood that it may incorporate any number thereof, such as, for instance, ninety, nine-hundred, or more or less. Furthermore, their geometrical configuration may be whatever would provide optimum reception of echo signal 16.

In this particular embodiment--disclosed in a small number of components form for the purpose of simplifying this disclosure-- energy converter 21 is connected to the inputs of a pair of isolation amplifiers 31 and 32; energy converter 22 is connected to the inputs of a pair of isolation amplifiers 33 and 34, and so forth, with the outputs of the remainder of said nine energy converter units connected to the inputs of isolation amplifiers 35 through 48, respectively. As shown, the odd numbered isolation amplifiers have their outputs connected to the respective inputs of a vertical column or sector selector switch 51.

Selector switch 51 is preferably operated manually by a human operator properly adjusting a shift lever 52 thereof in such manner that the three otputs thereof will be connected for electrical contact with any three energy converters in any one vertical column of energy converter elments. For instance, let it be assumed that energy converter elements 21, 24, and 27 form a first vertical column of energy converter elements; energy converter elements 2, 25, and 28 form a second vertical column of energy converter elements; and energy converter elements 23, 26, and 29 form a third vertical column of energy converter elements. Then by properly setting manually adjustable lever 52, the three outputs of vertical column selector switch 51 may be placed in electrical contact with said first, second, or third vertical columns of energy converter elements of transducer 17 at the discretion of the sonar operator in a manner that is conventional in the switching art. Of course, the direction of reception of the received target echo signals is determined by the vertical energy column selected at any given instant.

The three outputs of the aforementioned vertical column selector switch 51 are respectively connected to the inputs of a trio of control amplifiers 53, 54, and 55, each of which have a first control input which controls whether or not they pass the output signals from said vertical column selector switch, thereby effectively causing themm to act as control gates, and a second input which controls the gain thereof with time in accordance with a predetermined time variation, the variation of which will be discussed again subsequently. Suffice to say at this time, control amplifiers 53, 54, and 55 may be of the Micro-A-757C type gain controlled amplifiers, manufactured by the Fairchild Camera and Instrument Corporation of Mountain View, California.

The outputs of control amplifiers 53, 54, and 55 are connected together and connected to the data or intensity input of any suitable readout 56, such as, for instance, a vertical PPI having a horizontal sweep input and a vertical sweep input, as well as the aforesaid data or intensity input.

The horizontal sweep signal input of readout 56 is connected to the horizontal sweep signal output of a controllable azimuth sweep generator 57, which is designed to timely supply a predetermined frequency sawtooth signal at the ouput thereof in response to a preset timing signal supplied thereto by a ring counter 58 connected to the timing input thereof. The output of said ring counter 58 is also connected to the on-off control input of the aforesaid amplifiers 53, 54, and 55 in response to said preset timing signal.

An adjustable range sweep generator 59 has its output connected to the vertical sweep input of the aforementioned readout 56 and the input to an adjustable delay line 61. The output of delay line 61 is connected to the input of an adjustable time-varied-gain 62, the output of which is connected to the time-varied-gain control input of the aforesaid control amplifiers 53, 54, and 55.

For all practical purposes, the elements of FIG. 1 discussed so far may be considered as constituting the vertical or tilt receiver channel 63 of the subject sonar system. Now that portion thereof that may be considered as being the horizontal or bearing receiver channel 64 will be discussed as follows:

As may readily be seen from FIG. 1, receiving transducer 17 also constitutes the transducer for horizontal receiver channel 64, and as mentioned previously the plurality piezoelectric energy converters thereof are respectively connected to the inputs of a like plurality of isolation amplifiers, the outputs of which are connected to the appropriate inputs of a gang horizontal row selector and vertical column highlight switch 65.

Selector switch 65 is just like the aforementioned selector switch 51, but, of course, the inputs thereof are connected thereto in such manner that for any given setting—manual or otherwise—a particular row of three electroacoustical energy converters is effectively contacted electrically by the outputs thereof, respectively.

Also like switch 51, the horizontal row selector portion of switch 65 contains a switch setting lever 66 which may be manipulated in such manner by a human operator to select whatever horizontal row of three electroacoustical energy converters as is desired at any given time.

At this time, it would perhaps be worthwhile to mention that the settings of selector switches 51 and 65 are ordinarily implemented by the sonar operator or operators, as the case may be; nevertheless, it should be understood that in the event some particular switching sequence is necessary during some particular operational situation, they may be timely set automatically by any suitable pre-programmed porgrammers 67 and 68, respectively. Obviously, one skilled in the art having the benefit of the teachings presented herewith could optionally incorporate programmers 67 and 68, if so doing would optimize the invention for any given operational circumstance.

Another trio of control amplifiers 69, 70, and 71 (similar to the aforementioned control amplifiers 53, 54, and 55) are respectively connected to the trio of outputs of horizontal row selector portion of switch 65.

As will be discussed more fully subsequently in conjunction with FIG. 2, both vertical column selector switch 51 and horizontal row selector switch 65 incorporate a sector selector switch that causes the particular sector of the horizontal readout to be highlighted that corresponds to the horizontal row of electroacoustical energy converters of transducer 17 being sampled at any given instant and the particular sector of the vertical readout to be highlighted that corresponds to the vertical column of electroacoustical energy converters of transducer 17 being sampled at any given instant, respectively. Therefore, switch 51 is shown as having a given positive voltage supplied thereto, and a trio of outputs therefrom are respectively connected to the inputs of the aforesaid control amplifiers 69, 70, and 71, for timely supplying said positive voltage thereto. Likewise, switch 65 is shown as having a given positive voltage supplied thereto (which may be the same as or different from that supplied to switch 51), and a trio of outputs therefrom are respectively connected to the inputs of the aforementioned control amplifiers 53, 54, and 55, for timely supplying said positive voltage thereto.

The outputs of amplifiers 69, 70, and 71 are interconnected and connected to the data or intensity input of a readout 72 of any suitable type, but is preferably a horizontal PPI in this particular case.

The horizontal sweep input of readout 72 is connected to the output of an azimuth sweep generator 73 which, like azimuth sweep generator 57, produces a predetermined sawtooth frequency signal at the output thereof. A ring counter 74 has its output connected to the input of said azimuth sweep generator 73 and the on-off control inputs of the aforesaid control amplifiers 68 through 70.

The output of the aforementioned variable range sweep generator 59 is also connected to the vertical sweep input of readout 72.

At this time, it would ostensively be noteworthy that, as portrayed in FIG. 1, range sweep generator 59 has four outputs, rather than one. Such structural disclosure is shown without intended limitation, inasmuch as said four outputs may be considered as generating range sweep signals having the same or different frequencies, as desired by the artisan and as required by operational circumstances.

Furthermore, it would perhaps be noteworthy that receiving transducer 17, range sweep generator 59, delay 61, and time-varied-gain 62 are common to vertical and horizontal receiver channels 63 and 64; and, in addition, that range sweep generator 59 is common to receiver channel 63, receiver channel 64, and transmitter 11. It has been found that such arrangement tends to optimize the synchronization of said components and their internal elements as well, thereby increasing the utility and facilitating the operation of the invention.

Moreover, it would perhaps be of interest at this time that all of the elements and components of this invention are well known, conventional, and commercially available per se; therefore, it is to be understood that it is their new and unique interconnections and interaction that causes the subject invention to exist as a new and useful combination of elements and permit it to supply new and improved results and the above stated objectives.

FIG. 2 illustrates a representative gang switch that may be as vertical column selector switch 51 and horizontal row selector switch 65. As shown, it includes a trio of switches 91, 92, and 93, each of which has a trio of electrical contacts adapted for being connected to appropriate ones of the energy converters of the receiving transducer and a selector arm adapted for being connected to the control amplifiers as indicated in FIG. 1. In addition, a fourth switch 94 is disclosed as likewise having a trio of electrical contacts adapted for being connected to the appropriate control amplifiers and a selector arm adapted for being connected to some suitable positive voltage. Switches 91 thrugh 94 are ganged together as shown and are, therefore, switched simultaneously by any suitable manually operated lever—such as, for example, levers 52 and 66—or any suitable programmer—such as, for example, programmers 67 and 68.

Obviously, although the foregoing switch would be suitable for use as switches 51 and 65, numerous others, not shown, would be suitable therefor, too. Consequently, only the proper choice thereof by the artisan would be necessary.

FIGS. 3 through 6, being only quasi-graphical portrayals, will be discussed below in connection with the presentation of the theory of operation of the invention.

FIG. 7, being only a quasi-pictorial view of possible uses for the subject invention, will be explained during the discussion of the operation of the invention presented subsequently.

THEORY OF OPERATION

When transmitting sonic energy—whether it be of sonic or ultrasonic frequencies—between two locations in shallow water, it travels along certain paths. If a receiving hydrophone or transducer is in the direct path thereof, some of such sonic energy will travel directly thereto and, hence, be received thereby. Such situation is schematically shown in FIG. 3. Also shown therein is the fact that some sound travels thereto via a sea floor or bottom (B) path and some sound travels thereto via the water surface (S) path, or both. In addition, it may readily be appreciated that with each reflection the sonic energy is scattered and, thus, losses occur. Hence, those paths with large numbers of reflections ordinarily do not carry much energy to the hydrophone.

A common method of analyzing such "multipathing" phenomenon is through use of images, as also illustrated in FIG. 3. Each image represents one ray path and is located at its apparent position from the point of view of the hydrophone; that is, each image has an apparent range and tilt angle.

If the source in the surface is displaced along the surface, and if its images are plotted with range vs. elevation or tilt, the graphical representation of FIG. 4 is obtained. Instead of a source being in a surface, the sound could have been transmitted in the water near the hydrophone and considered as being reverberations from each area of the surface in the same way. Then FIG. 4 would be a plot of the loci of surface reverberation and its images. The same process, of course, could be extended to include sea bottom reverberation on the same plot.

As should be obvious by now, the subject invention contains two readouts, preferably the usual PPI as a horizontal display, as shown in FIG. 5, and another PPI display, as shown in FIG. 6, showing exemplary vertical distribution of both reverberation and targets. The information depicted on the horizontal display is usually obtained from a large number of receiving transducer lobes which are highly directive in rows in the horizontal plane. Likewise, the information portrayed by the vertical display is obtained from a large number of receiving transducer lobes which are highly directive in columns in the vertical plane—or in a plane that is normal to the aforesaid horizontal plane, in the event the entire receiving transducer is disposed at such attitude that the words "horizontal" and "vertical" would not be accurate. Nevertheless, in order to simplify this disclosure, they will be referred to herein as horizontal rows and vertical columns, although it is conceivable that the artisan making and using the instant invention might choose some other angular relationship for his transducer energy convert er columns and rows, or, as a matter of fact, some other geometrical configuration therefor altogether. In any event, the receiving lobes and highly directive in both planes in the preferred embodiment being discussed, which causes it to be distinguished over all known prior art to some extent, because said prior art sonars employ much less directivity in the vertical plane. Moreover, the sensing of conditions in the ambient medium in both the horizontal and vertical planes—and especially in the vertical plane—enables the operator of the subject sonar to make such manual selections of the best operative rows of receiving rows of receiving energy converters, so as to optimize the resolution of any targets acquired from locations which would otherwise be noisy due to excessive reverberations, as a result of his having a display of such vertical reverberations at his disposal for consideration at all times. Of course, when highlighted by sector on the readout, obtaining improved target resolution is facilitated. Hence, in a typical operation of tracking a target (T), the horizontal display operator—in the event there are two operators—could keep the vertical electroacoustical energy converter array on the correct target bearing, and the vertical display operator could keep the horizontal array at its optimum tilt or elevation and bandwidth. Hence, in summary, it may readily be seen that the purpose of the vertical display is to provide a measurement or assessment of environmental conditions (such as those exemplary illustrated in FIG. 6) in real time. It further shows an operator how to adjust his transducer tilt to exclude much of the boundary reverberation, and to pick that ray path which is most efficiently transporting acoustical energy to and from a chosen target.

MODE OF OPERATION

As presented in the quasi-pictorial illustration of FIG. 7, any marine vehicle, such as, for example, boat 101, may contain the subject sonar 102 of the type shown in FIG. 1. Hence, as may readily be discerned from FIGS. 1 and 7, transmitting transducer 12 broadcasts search signal 13 through water 14 where it acquires target 15 and is reflected therefrom as echo signal 16 which is subsequently received by receiving transducer 17.

As the received target and the search and echo signal paths are displayed in horizontal and vertical readouts 72 and 56, respectively, the operator (or pair of operators, as the case may be) manipulates switches 65 and 51 in order to select the receiving transducer rows and columns which provide the best view of target, 15 as it is portrayed in manners similar to those depicted in FIGS. 5 and 6, respectively. As a result, target 15 is shown with considerably less background reverberations, noise, and any other clutter that may be present between target 15 and receiving transducer 17. Of course, due to a switch similar to switch 94 being employed in both selector switches 65 and 51, a small positive voltage—say, of the order of 0.1 micro volts—is added to whatever sectors of the readout scopes selected by the sonar pperatpr. thereby highlighting those horizontal and vertical sectors which, in turn, improve the visual image of target 15 and the range and bearing information relevant thereto.

Of course, like in any other sonar, target range is proportional to the combined travel times of search and echo signals 13 and 16, and target bearing is ascertained because it is proportional to that column receiving transducer column which receives the target best.

Optimum range gating procedures may be employed by means of properly adjusting the frequency of range sweep generator 59, and optimum time-varied-gain characteristics may be obtained by means of properly adjusting delay 61 and time-varied-gain 62 for any given acquired target.

As previously mentioned, programmers 67 and 68 may optionally be used, in the event it is desired that transducer columns and rows be automatically scanned.

The timing of the transmitted CW pulses of acoustical energy search signals by transmitting transducer 12 is effected by range sweep generator 59, and the gated reception times are likewise controlled thereby, by delay 61, and by time-varied-gain 62, the latter of which timely supplies gain varying signals to the time-varid-gain control inputs of the aforesaid control amplifiers. Hence, range gating is accomplished which further improves the resolution and fidelity of any acquired underwater targets.

Ring counters 58 and 74 are, in fact, master clocks that generate timing signals which, in turn, instigate the generation of sawtooth signals by azimuth sweep generators 57 and 73. Said sawtooth signals are then supplied to the horizontal sweep inputs of vertical and horizontal PPI readouts 56 and 72, respectively. Consequently, as is customary in the art, said readouts display target and perhaps other data that is subject to observation and interpretation by the sonar operator or operators. However, in this particular case, both the selected vertical and horizontal sectors are highlighted or otherwise emphasized, so that most of the extraneous and spurious signals received by the subject sonar may be disregarded, thereby leaving the display of an acquired target in a less cluttered environment on the screens of the readouts.

In view of the foregoing, it may readily be seen that the subject sonar constitutes a unique system which produces new and improved results not found in any known sonar systems of the prior art.

Obviously, other modifications of the subject invention will readily come to the mind of one skilled in the art having the benefit o the teachings presented in the foregoing description and the drawing. It is, therefore, to be understood that this invention is not to be limited thereto and that said modifications and embodiments are intended to be included within the scope of the appended claims.

What is claimed is:

1. A sonar system, comprising in combination:
   first receiving means for receiving a first acoustical signal from an underwater target via a first path sector of the water encompassing said target;
   second receiving means for receiving a second acoustical signal from the aforesaid underwater target via a second path sector that is different from said first path sector of the water and which encompasses said target; and
   first and second readout means connected to the outputs of said first and second receiving means for reading out images of said target and said first and second water path sectors encompassing it, respectively, said first readout means comprising a data input, a vertical azimuth sweep input, and a range sweep input, and said second readout means comprising a data input, a horizontal azimuth sweep input, and a range sweep input;
   said first receiving means comprising a receiving transducer having a plurality of electroacoustical energy converters disposed in a predetermined number of columns and rows, a predetermined plurality of isolation amplifiers connected to the outputs of said electroacoustical energy converters, an adjustable vertical column selector switch connected to the outputs of said predetermined plurality of isolation amplifiers, a plurality of control amplifiers, each having a data input, an on-off control input, a time-varied gain control input, and an output, with the data inputs of said control amplifiers connected to respective ones of a like plurality of outputs of said adjustable vertical column selector switch, said first receiving means further comprising a vertical azimuth sawtooth sweep signal generator having an input and having an output connected to said vertical azimuth sweep input, a ring counter connected to said input of said vertical azimuth sawtooth sweep signal generator for effecting the timing thereof and to said on-off inputs of said isolation amplifiers, and an adjustable range sweep generator connected to said range sweep input.

2. The sonar system of claim 1, wherein said first path sector of water is a vertical path sector of water, and wherein said second path sector of water is a horizontal path sector of water.

3. The sonar system of claim 1, wherein said first and second path sectors of water are perpendicular to each other.

4. The invention of claim 1, further characterized by:
   means connected between the output of said first receiving means and an input of said readout means for highlighting a predetermined segment of said second path sector which contains the image of said target; and
   means connected between the output of said second receiving means and an input of said readout means for highlighting a predetermined segment of said first path sector which contains the image of said target.

5. The sonar system of claim 1, further characterized by means for broadcasting a predetermined acoustical search signal throughout the water containing said target, so as to cause said predetermined acoustical search signal to be reflected from said target as the aforesaid first and second received acoustical signals.

6. The invention of claim 1, further characterized by:
   an adjustable delay connected to the output of said adjustable range sweep generator; and
   a time-varied-gain connected between the output of said adjustable delay and the time-varied-gain control inputs of the aforesaid plurality of control amplifiers.

7. The invention of claim 1, further characterized by another switch ganged with the aforesaid adjustable vertical column selector switch, with said another switch comprising:
   a plurality of electrical contacts;
   a movable arm adapted for making contact with any one of said electrical contacts;
   with said plurality of electrical contacts adapted for being connected to the data inputs of a like plurality of control amplifiers; and
   with the movable arm thereof adapted for being electrically connected to a predetermined positive voltage.

8. The invention of claim 1, further characterized by means connected to said adjustable vertical column selector switch for effecting the manual switching thereof.

9. The invention of claim 1, further characterized by programmer means connected to said adjustable vertical column selector switch for effecting the switching thereof in accordance with a predetermined program.

10. The sonar system of claim 1, wherein said second receiving means comprises:
- a receiving transducer having a plurality of electroacoustical energy converters disposed in a predetermined number of columns and rows;
- a predetermined plurality of second isolation amplifiers connected to the outputs of said electroacoustical energy converters;
- an adjustable horizontal row selector switch connected to the outputs of said predetermined plurality of second isolation amplifiers;
- a plurality of second control amplifiers, each of which has a data input, and on-off control input, a time-varied-gain control input, and an output, with the data inputs thereof connected to a like plurality of outputs of said adjustable horizontal row selector switch, respectively;
- a horizontal azimuth sawtooth sweep signal generator, having an input and an output, with the output thereof connected to the horizontal azimuth input of said second readout means:
- a ring counter connected to the inputs of said horizontal azimuth sawtooth sweep signal generator for effecting the timing thereof and to the on-off control inputs of the aforesaid second isolation amplifiers; and
- said adjustable range sweep generator being connected to said range sweep input of said second readout means.

11. The invention of claim 10, further characterized by:
- an adjustable delay connected to the output of said adjustable range sweep generator; and
- a time-varied-gain connected between the output of said adjustable delay and the time-varied-gain control inputs of the aforesaid plurality of control amplifiers.

12. The invention of claim 10, further characterized by another switch ganged with the aforesaid adjustable horizontal row selector switch, with said another switch comprising:
- a plurality of electrical contacts;
- a movable arm adapted for making contact with any one of said electrical contacts;
- with said plurality of electrical contacts adapted for being connected to the data inputs of a like plurality of control amplifiers; and
- with the movable arm thereof adapted for being electrically connected to a predetermined positive voltage.

13. The invention of claim 10, further characterized by means connected to said adjustable horizontal row column selector switch for effecting the manual switching thereof.

14. The invention of claim 10, further characterized by programmer means connected to said adjustable horizontal row selector switch for effecting the switching thereof in accordance with a predetermined program.

15. A sonar system, comprising in combination:
- a receiving transducer having a plurality of piezoelectric energy converters all of which are geometrically deployed in such manner as to form a plurality of vertical columns and a plurality of horizontal rows;
- a first plurality of isolation amplifiers respectively connected to the piezoelectric energy converters of said receiving transducer;
- a vertical column selector switch connected to the outputs of said first plurality of isolation amplifiers;
- a first plurality of control amplifiers, each of which has a data input, an on-off control input, a time-varied-gain control input, and an output, with the data inputs thereof connected to the outputs of said vertical column selector switch, respectively;
- a first readout, having a data input, a horizontal sweep input, and a vertical sweep input, with the data input thereof connected to the outputs of the aforesaid first control amplifiers;
- a first ring counter, the output of which is connected to the on-off control inputs of said first control amplifiers;
- a first azimuth sweep generator connected between the output of said first ring counter and the horizontal sweep input of said first readout;
- a second plurality of isolation amplifiers respectively connected to the piezoelectric energy converters of said receiving transducer;
- a horizontal row selector switch connected to the outputs of said second plurality of isolation amplifiers;
- a second plurality of control amplifiers, each of which has a data input, an on-off control input, a time-varied-gain control input, and an output, with the data inputs thereof connected to the outputs of said vertical column selector switch, respectively;
- a second readout, having a data input, a horizontal sweep input, and a vertical sweep input, with the data input thereof connected to the outputs of the aforesaid second control amplifiers;
- a second ring counter, the output of which is connected to the on-off control inputs of said second control amplifiers;
- a second azimuth sweep generator connected between the output of said second ring counter and the horizontal sweep input of said second readout; and
- an adjustable range sweep generator, with the output thereof connected to the vertical sweep inputs of the aforesaid first and second readouts.

16. The sonar system of claim 15, characterized by:
- an adjustable delay connected to the output of said adjustable range sweep generator; and
- an adjustable time-varied-gain connected between the output of said adjustable delay and the time-varied-gain control inputs of the aforesaid first and second pluralities of control amplifiers.

17. The sonar system of claim 15, further characterized by:
- a first positive voltage;
- a first hightlight switch, having a movable arm and a plurality of electrical contacts adapted for being timely contacted by said movable arm, with the movable arm thereof connected to said first positive voltages, and with the plurality of electrical contacts thereof connected to the data inputs of the aforesaid second plurality of control amplifiers, respectively;
- a second positive voltage;
- a second highlight switch, having a movable arm and a plurality of electrical contacts adapted for being timely contacted by said movable arm, with the movable arm thereof connected to said second positive voltage, and with the plurality of electrical contacts thereof connected to the data inputs of the aforesaid first plurality of control amplifiers.

18. The sonar system of claim 15, further characterized by:
- a transmitter connected to the output of said adjustable range sweep generator; and
- a transmitting transducer connected to the output of said transmitting transducer.

* * * * *